United States Patent [19]

Johnson

[11] 4,051,019

[45] Sept. 27, 1977

[54] METHOD FOR LOADING FINELY DIVIDED PARTICULATE MATTER INTO A VESSEL

[75] Inventor: James A. Johnson, Clarendon Hills, Ill.

[73] Assignee: UOP Inc., Des Plaines, Ill.

[21] Appl. No.: 616,798

[22] Filed: Sept. 25, 1975

Related U.S. Application Data

[63] Continuation-in-part of Ser. No. 463,074, April 22, 1974, abandoned.

[51] Int. Cl.² ............... B65B 37/02; B65G 3/04; C10G 11/01
[52] U.S. Cl. ................... 208/146; 141/12; 208/152; 302/66
[58] Field of Search ............... 302/17, 29, 31, 66; 141/12, 67, 71, 73; 53/24, 22 R, 124 B; 208/146, 150, 152, 167, 165

[56] References Cited

U.S. PATENT DOCUMENTS

| | | | |
|---|---|---|---|
| 2,458,162 | 1/1949 | Hagerbaumer | 208/167 |
| 2,723,883 | 11/1955 | Lapple | 302/17 |
| 3,502,574 | 3/1970 | Baillie | 208/150 |
| 3,668,115 | 6/1972 | Uhl et al. | 208/146 |
| 3,718,579 | 2/1973 | Uhl et al. | 208/146 |
| 3,847,191 | 11/1974 | Aronson | 141/67 |

*Primary Examiner*—Herbert Levine
*Attorney, Agent, or Firm*—James R. Hoatson, Jr.; Thomas K. McBride; William H. Page, II

[57] ABSTRACT

A method for loading finely divided particulate matter into a vessel for the purpose of increasing the packing density by introducing a fluid medium counter-current to the downward flow of the finely divided particulate matter at a velocity selected to maximize the apparent bulk density of the particulate matter in the vessel.

4 Claims, No Drawings

METHOD FOR LOADING FINELY DIVIDED PARTICULATE MATTER INTO A VESSEL

CROSS-REFERENCE TO RELATED APPLICATION

This application is a continuation-in-part of my co-pending application Ser. No. 463,074, filed Apr. 22, 1974 now abandoned.

This invention relates to a method for loading finely divided particulate matter, preferably catalyst and more preferably hydrocarbon conversion catalyst, into a vessel for the purpose of increasing the packing density.

In the past, particulate matter has been loaded into a vessel by what is commonly referred to as the "sock" method. In this method, a hopper having an attached hose which extends to the bottom of the vessel or to the particulate matter surface is utilized. The hopper and hose are filled with particulate matter and the particulate matter is released at the bottom of the hose by raising the hose slowly. The resulting bed is in the shape of a cone which, during the loading of the particulate matter, can be distributed over the bed by raking. One of the problems that is associated with loading vessels by this method is that the bed can contain excessive voids which limit the amount of particulate matter which may be placed or stored in a given vessel. In the case where the vessel is a catalytic reaction zone or reactor such voids can, during use, bring about catalyst settling problems, localized hot spots during the exothermic reactions of reactants and the necessity to utilize increased reactor volume.

Thus, the settling of catalyst can change the overall volume of the catalyst bed thereby producing damage to equipment such as thermowells which have been inserted into the reactor for temperature measurements. In addition, the settling of catalyst can reduced the surface of the catalyst bed to a level whereby the thermowell is not in contact with the catalyst, thereby not allowing the reaction temperature to be properly monitored during the course of a reaction. Excessive voids in a sock-loaded catalyst bed cause poor gas, liquid, or gas-liquid distribution through the bed. This maldistribution often requires decreased throughput or increased temperatures, since the resulting catalyst utilization is low and product specifications may not be met. Settling problems associated with sock-loaded beds may result in damage to other reactor internals, such as baskets, redistribution trays, catalyst supports and quench spargers.

An additional problem associated with the prior methods of charging catalyst is that for a given reactor volume the amount of catalyst which can be charged is determined by the final catalyst density. Thus, a means for increasing the bulk density of catalyst present in a reaction zone would allow for increased throughput of reactants at the same severity or the same throughput at lower severity. Thus, more severe reaction conditions and/or increased throughput can be obtained for a given reaction zone volume if an increase in bulk density of the catalyst can be achieved.

Vessel loading difficulties are not merely reserved for the loading of catalyst into reaction zones or reactors but are found to exist in almost every application where finely divided particulate matter must be loaded into vessels. For example, grain, bulk chemicals, fertilizer, steel pellets, crushed rock, rock salt, coal, coke, etc., may be successfully loaded according to this invention. The particulate matter may be spheres, pellets, extrudates, cylinders, flakes, pills, crystals, granules, etc.

More recently, the prior art has taught an improved "free-fall" method for loading finely divided particulate matter into a vessel for the purpose of increasing the packing density which comprises charging to the vessel in downflow relationship to said vessel, solid particulate matter at a rate of fill of the vessel of up to about 17 vertical inches per minute and at an average free-fall distance of the particulate matter through a non-flowing gaseous medium to the bed surface of at least several feet and distributing the particulate matter over the entire bed surface at substantially the same rate of fill. This technique is particularly well suited for loading spherical catalyst and extruded catalyst into a reaction zone or reactor.

Although the prior art is cognizant that the hereinabove described method will increase catalyst utilization in catalytic reaction zones, I have discovered that this method of packing becomes less effective as the bed height increases and as the falling distance decreases and that this disadvantage of loading through a continuously decreasing falling distance can be overcome by pumping a fluid medium counter-current to the direction of particle fall. Use of the method of this invention is believed to provide additional drag forces required for desirable orientation of particles during free-fall over continuously decreasing distances. This method also provides an exit for undesirable fine particles which, if left in the densely packed vessel, might contribute to plugging of the bed.

In U.S. Pat. No. 2,723,883, the patentee teaches a method for the control of solids flow into or from a confined spaced. The diameter of the particle size exemplified was of the 100 micron size and the confined space was exemplified as a conduit designed to transport particulate solids from one area, through the conduit and to another area. A gas flow is introduced intermediate the ends of such a conduit while particulate matter is flowing to seal against the pressure differential which is imposed on the area at each end of the conduit and to automatically maintain a given flow rate through the conduit at which solids are supplied to such conduit even though the rate of supply itself may vary. No large supply of gas is required since the motivating gas is just sufficient to effect the desired rate of gravity flow discharge, and the quantity of gas will give a gas velocity through the lower or discharge end of the conduit that is normally on the order of 1 to 2 feet per second and is therefore to be contrasted with the higher quantities of gas commonly used in solids transport conduits wherein the solids are transported through conduits as entrained solids and the velocity of the entraining gas is normally on the order of 50 to 150 feet per second.

In the fluid catalytic cracking art, it is well known that during processing of heavy distillate hydrocarbons to produce gasoline and lighter distillate hydrocarbons, said heavy hydrocarbons are sprayed into a shower of solid particles. A typical explanation of such a process is contained in U.S. Pat. No. 2,458,162 which further describes the flow relationship between the hydrocarbon fluid and the solid particles as essentially co-current. The patentee does not teach or expect any significant counter-current contact between the fluid and the solids let alone anticipate a counter-current velocity differential equal to or greater than the terminal velocity of the solid particles.

A particular advantage for the use of catalyst loaded with the method such as hydrogenation, reforming, hydrocracking, polymerization, hydrodesulfurization, dehydrogenation, etc., wherein such hydrocarbon conversion processes are carried out in a non-fluidized catalyst bed reactor, which includes fixed bed reactors and moving bed reactors. This invention is particularly advantageous with hydrodesulfurization, hydrocracking, hydrogenation and reforming processes. A particularly preferred application of this invention is with reforming and hydrogenation processes. The various process conditions of temperature, pressure and space velocity vary according to the process and such conditions include those well known to those skilled in the above-mentioned processes. The use of the present invention has no beneficial application to fluid catalytic reaction zones since the objective of dense loading catalyst particles within the reaction zone is completely absent in the operation of a fluid catalytic cracking unit.

An additional advantage of increased bulk density of loaded catalyst is that catalyst life may be extended for the same throughput and severity. This extension of catalyst life is a result of the tangible effect of the increased weight of catalyst in a fixed reactor volume as well as the less tangible effect of uniform gas, liquid or gas-liquid distribution which coincides with the more uniform voidage of a densely-loaded catalyst bed. Longer catalyst life results in a longer unit run length.

Furthermore, dense loading of all reactors in an integrated refinery would provide a means for predicting, controlling and optimizing the occurrence of turnaround, based on the premise that catalyst life in each reactor of the refinery network would become a predictable function of tangible factors such as catalyst properties, throughput and operating severity. Intangible effects associated with maldistribution, settling and hot spots would be minimized by dense catalyst loading.

A principal object of my invention is to increase the packing density of a vessel having a fixed bed which is loaded with finely divided particulate matter.

Another object of my invention is to economize the storage of finely divided particulate matter in a vessel.

Still another object of my invention is to provide a densely packed fixed-bed hydrocarbon conversion zone which has a minimum of void space and which displays uniform flow distribution characteristics therein.

Therefore, in one embodiment, my invention provides a method for loading finely divided particulate matter into a vessel having a fixed bed for the purpose of increasing the packing density and without fluidizing said particulate matter which comprises the following steps: (a) introducing said finely divided particulate matter into the upper portion of said vessel; (b) introducing a fluid medium counter-current to the flow of said finely divided particulate matter and at a rate insufficient to fluidize said particulate matter; (c) adjusting the flow of said fluid medium to continuously maintain a constant velocity differential between said fluid medium and the falling finely divided particulate matter which velocity differential is at least as great as the free-fall terminal velocity of said finely divided particulate matter.

In a particularly preferred embodiment, the utilization of this particulate matter loading provides for an improved fixed-bed catalytic hydrogenation process wherein a hydrogenation catalyst is charged to a reactor by means of the present invention; then hydrogen and a hydrogenatable organic material, for example, a petroleum hydrocarbon, are contacted with said hydrogenation catalyst and a hydrogenated organic material is recovered. Thus, the hydrogenation process of this invention provides for allowing more throughput at the same severity for a given reactor and for greater catalyst weight per volume of reactor. The increase in catalyst bulk density, therefore, allows for the construction and use of smaller and less expensive reactors for a given throughput.

My invention is used to charge catalyst particles to a fixed-bed reactor in downflow relationship to said reactor. In general, reactor sizes varying between about 1 to about 16 feet, preferably from about 2 to about 13 feet in diameter, and from about 5 to about 125 feet, more preferably from about 10 to about 75 feet in length can be charged. The rate of fill of the reactor can be non-uniform. However, it is preferred that the rate of fill be uniform and that after a given rate of fill is established, that this rate of fill be maintained while preparing the catalyst bed. The catalyst particles are introduced into the reactor at a point such that the distance to the catalyst surface formed as the catalyst particles are introduced through a gaseous medium provides an average free-fall distance of catalyst particles of at least about 1 foot, more preferably an average free-fall distance of from about 5 to about 125 feet and still more preferably from about 10 to about 70 feet. The gaseous medium in general is air, or depending on the catalyst, an inert medium such as nitrogen or steam. Generally, the fluid medium is selected to provide an inexpensive and readily available gas which is inert or non-reactant with respect to the particulate matter being loaded at the temperature and pressure conditions utilized or present during loading. Thus, in general, the catalyst particles fall individually to the catalyst surface as the catalyst bed is formed. The catalyst particles are distributed over the surface area of the catalyst bed as it is formed such that the catalyst surface rises at a substantially uniform rate. The catalyst particles are distributed in order to produce a catalyst surface which has a difference between the highest portion of the catalyst surface and the lowest portion of the catalyst surface which is less than 10 percent of the diameter of the catalyst bed, that is a substantially flat surface, more preferably less than 5 percent and still more preferably less than 1 percent.

In order to obtain the best results using the method of the instant invention, both the fluid medium and the finely divided particulate matter should preferably be uniformly distributed across the vessel's cross section before the particulate matter is counter-currently contacted with the fluid medium.

The term "rate of fill" implies the rise in bed height and may be expressed with units of feet per hour (ft./hr.). Another term, particle flux, is convenient to characterize the features of the loading speed and is defined as the pounds of catalyst particles dropped on an area of one square foot in one hour ($lb/ft^2$-hr.). It has been found that there is a certain particle flux most favorable for optimal loading of a given catalyst. Particle flux and rate of fill are related by the catalyst loaded bulk density:

$$\frac{\text{Flux}, \frac{lb}{ft^2\text{-hr.}}}{\text{Loaded } ABD, \frac{lb}{ft^3}} = \text{Rate of Fill, ft/hr.}$$

I have found that a flux between 100 and 1500 lb/hr-ft$^2$ is preferred for increasing the catalyst loaded bulk density, and that more preferable results are obtained for most catalysts using a flux between 300 and 1000 lb/hr-ft$^2$.

The above rates of fill, free-fall distance and uniform distribution of the catalyst within the above preferred ranges are preferred since they provide for approaching substantially the maximum bulk density achievable for a given catalyst bed. The reactor sizes which are preferred are those reactors which, in general, are utilized in commercial processes such as hydrogenation, reforming and hydrocracking.

This invention is applicable to catalyst particles which are spheres, pills, extrudates, crystals, cylinders, etc. In general, the particle diameter should not be greater than 3% of the reactor diameter and, preferably with a diameter of from about one sixty-fourth to about ½ of an inch, more preferably from about one-sixteenth to about one-fourth of an inch. Catalyst particle diameter refers to the nominal particle dimension in the case where the particle is not spherical.

A wide variety of solid catalysts may be charged to catalytic reaction zones with the method of the present invention such as oxidation, hydrodesulfurization, hydrocracking, cracking, reforming and hydrogenation catalysts. Typical examples of hydrodesulfurization catalyst comprise any of the transitional metals, metal oxides, metal sulfides, or other metal salts which are known to catalyze hydrodesulfurization reactions, and are not poisoned by hydrogen sulfide or other sulfur compounds. The preferred catalysts comprise the oxides and/or sulfides, as for example the oxides or sulfides of molybdenum, tungsten, iron, cobalt, nickel, chromium and the like. Vanadium compounds may also be employed in some cases. A particularly active combination consists of a Group VI-B metal oxide or sulfide with a Group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate which actually may be a mixture of cobalt and molybdenum oxides wherein the atomic ratio of Co and Mo may be between about 0.4 and 5.0. The catalyst, or any of the above catalysts may be employed in unsupported form, or alternatively it may be suspended on a suitable adsorbent oxide carrier such as alumina, silica, zirconia, thoria, titania, bauxite, acid-activated clays, or any combination of such materials.

Typical examples of hydrocracking catalysts are crystalline metallic aluminosilicate zeolites, having a platinum group metal (e.g., platinum or palladium) deposited thereon or composited therewith. These crystalline zeolites are characterized by their highly ordered crystalline structure and uniformly dimensioned pores, and have an aluminosilicate anionic cage structure wherein alumina and silica tetrahedra are intimately connected to each other so as to provide a larger number of active sites, with the uniform pore openings facilitating entry of certain molecular structures. It has been found that crystalline aluminosilicate zeolites, having effective pore diameter of about 6 to 15, preferably 8 to 15 Angstrom units, when composited with the platinum group metal, and particularly after base exchange to reduce the alkali metal oxide (e.g., Na$_2$O) content of the zeolite to less than about 10 weight percent, are effective hydrocracking catalysts. Other suitable carrier or supports include acidic supports such as: silica-alumina, silica-magnesia, and other well known cracking catalyst bases, the acid clays, fluorided alumina, and mixtures of organic oxides, such as alumina, silica, zirconia and titania, having sufficient acidic properties providing high cracking activity, and a mixture of support materials. Thus, for example, a zeolite and an alumina can be blended together as a support material in varying proportions which support materials contain various metals deposited thereon.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally it is preferred that an oxide or sulfide of a Group VIII metal (particularly iron, cobalt or nickel) be present in mixture with an oxide or sulfide of a Group VI-B metal (preferably molybdenum or tungsten). A suitable support is alumina.

Typical dehydrogenation or reforming catalysts are alumina, having a platinum group metal component deposited thereon or composited therewith. Particularly active reforming catalysts also contain one or more components selected from the group of tin, rhenium, germanium and iridium.

The following examples are presented for the purpose of illustrating the beneficial effects of my method for loading catalyst particles into a fixed-bed reaction zone. It is understood that the present invention is not intended to be limited, beyond the scope and spirit of the appended claims, to the operating conditions, catalysts and reaction zone configuration as utilized within the examples.

EXAMPLE I

A 2 foot diameter vessel is selected to be loaded with one-sixteenth inch diameter alumina catalyst spheres by means of the conventional prior art "free-fall" method of loading which is hereinabove described and also by means of the loading method of the present invention to compare the ability of the two methods to maximize the apparent bulk density (ABD) of the loaded catalyst. The catalyst particles loaded with the prior "free-fall" method has an apparent bulk density (ABD) of 0.520 g/cc., while the catalyst loaded with the method of the present invention demonstrates an ABD of 0.570 g/cc. This increase in ABD is a 9.6% increase over the prior art method. The comparison of the catalyst loading methods of this example is presented in the following Table I.

TABLE I

Apparent Bulk Density (ABD) Comparison For 1/16" Diameter Spherical Catalyst Particles

| | Free-Fall Method | Catalyst Loading Device Of The Present Invention | Increased In ABD, % |
|---|---|---|---|
| ABD, g/cc. | 0.520 | 0.570 | 9.6 |

EXAMPLE II

This example utilizes the same vessel and loading techniques as those of Example I. However, the catalyst particles selected for use in the example are one thirty-second inch diameter extrudates which have a length to diameter ratio of from about 6.5 to about 8. The ABD of the extrudate catalyst which is loaded by the free-fall method and the loading method of the present invention, is found to be 0.597 g/cc. and 0.663 g/cc., respectively. This increase in ABD represents a 10.9% increase over the prior art method. The comparison of the catalyst loading methods of this example is presented in the following Table II.

TABLE II

Apparent Bulk Density (ABD) Comparison For 1/32" Diameter Extrudate Catalyst Particles

|  | Free-Fall Method | Catalyst Loading Device Of The Present Invention | Increase In ABD, % |
|---|---|---|---|
| ABD, g/cc. | 0.597 | 0.663 | 10.9 |

The foregoing examples and description illustrate the present invention and the benefits afforded through the utilization thereof.

I claim as my invention:

1. A method for forming a fixed-bed of catalyst particles which is subsequently contacted by a reactant feedstock comprising in the absence of a reactant feedstock,
   a. loading finely divided catalyst particulate matter having a diameter from about one sixty-fourth to about one-half inch into a reactor vessel having said fixed-bed for the purpose of increasing the packing density of said fixed-bed and without fluidizing said particulate matter which comprises the following steps:
   b. introducing said finely divided particulate matter into the upper portion of said vessel uniformly across said vessel's cross-section at a particle flux of from about 300 to about 1,000 lb/hr-ft$^2$;
   c. introducing an inert, non-reactant fluid medium uniformly across said vessel's cross-section and counter-current to the flow of said finely divided particulate matter and at a rate insufficient to fluidize said particulate matter;
   d. adjusting the flow of said fluid medium to continuously maintain a constant velocity differential between said fluid medium and the falling finely divided particulate matter which velocity differential is at least as great as the free-fall terminal velocity of said finely divided particulate matter.

2. The method of claim 1 further characterized in that said fluid medium is an inert non-reactant gas.

3. The method of claim 1 further characterized in that said catalyst particulate matter is a hydrocarbon conversion catalyst.

4. The method of claim 1 further characterized in that said reactor vessel is a hydrocarbon reaction zone.

* * * * *